United States Patent Office 2,867,579
Patented Jan. 6, 1959

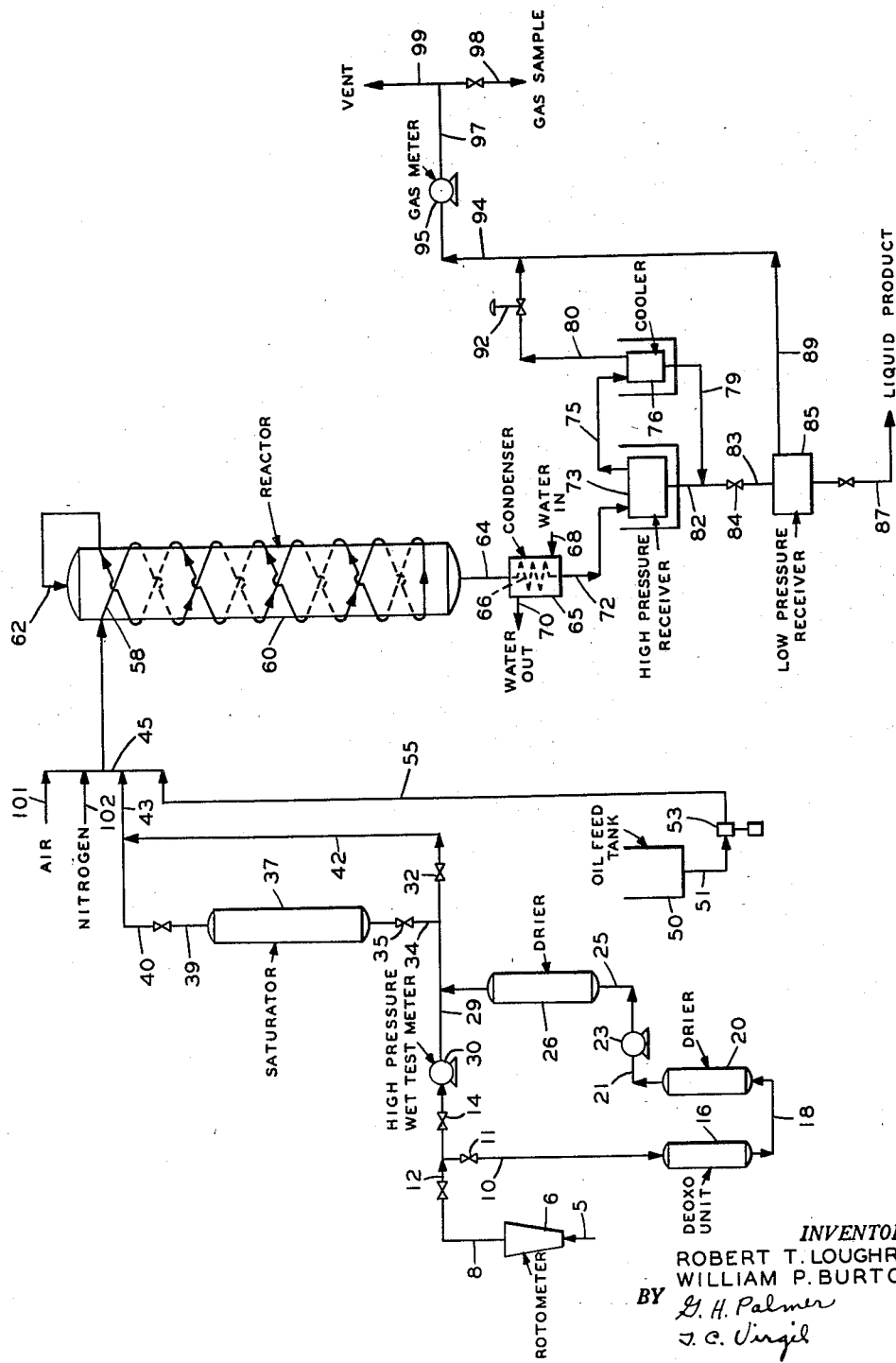

2,867,579

REACTIVATION OF CATALYST FOR USE IN THE REFORMING OF HYDROCARBON OILS

Robert T. Loughran, Jersey City, and William P. Burton, Little Silver, N. J., assignors to The M. W. Kellogg Company, Jersey City, N. J., a corporation of Delaware Application August 2, 1952, Serial No. 302,352

17 Claims. (Cl. 208—136)

This invention relates to an improved reforming process, and more particularly pertains to an improved hydroforming process for naphtha fractions whereby high yields of high anti-knock gasolines are produced.

It is an object of this invention to provide an improved reforming process for light hydrocarbon oils.

Another object of this invention is to provide an improved hydroforming process for naphtha fractions, which is especially effective for producing unusually high yields of high anti-knock gasoline.

Still another object of this invention is to provide an improved reforming process for light hydrocarbon oils which utilizes a molybdenum oxide catalyst.

Other objects and advantages will become apparent from the following description and explanation thereof.

In accordance with the present invention, light hydrocarbon oils are reformed by the process which comprises first treating a molybdenum oxide catalyst with a hydrogen-containing gas in the presence of water at an elevated temperature before contacting the catalyst with the light hydrocarbon oil under reforming conditions, with or without the use of a small amount of water. More particularly, the molybdenum oxide catalyst is pretreated before use in the reforming step by contacting the same with a hydrogen-containing gas having at least about 2 mol percent of water, based on the hydrogen. Still more particularly, the molybdenum oxide catalyst which is tentatively deactivated with a carbonaceous deposit is regenerated with an oxygen-containing gas having an oxygen partial pressure of at least about 5 p. s. i. a. The catalyst thus regenerated is pretreated or pre-reduced in the manner described above.

The molybdenum oxide catalyst is pretreated with a hydrogen-containing gas in the presence of a small amount of water. The presence of water effects a beneficial result with respect to the yield of reformed liquid product of a high octane level. Generally, for the purpose of pretreatment of the catalyst, water is employed in the amount of about 0.1 to about 15 mol percent based on the quantity of hydrogen employed, more usually, about 1.0 to about 6.0 mol percent water, on the same basis. The hydrogen-containing gas employed for this purpose can be pure hydrogen or a gas containing hydrogen in an amount of about 35 to about 80 percent by volume. The pretreatment is effected at an elevated temperature in the range of about 750° to about 1200° F., more usually about 875° to about 1050° F. At the elevated temperature, the pretreatment can be conducted at atmospheric pressure, or a superatmospheric pressure of about 50 to about 1000 p. s. i. g. In practice, the pretreatment can involve contacting the molybdenum oxide catalyst with a hydrogen-containing gas including water, under static conditions or a flow condition in which a continuous flow of hydrogen is maintained over the catalytic material. A static condition involves contacting the catalyst wth the hydrogen-containing gas with no net flow of hydrogen, leaving the zone containing the catalyst. In some instances, it is preferred to employ the combination of first pretreating the catalyst with a hydrogen-containing gas under static conditions, and then permitting a net flow of hydrogen to be established, following the treatment under static conditions. The reverse procedure can also be used, viz., where a net flow of hydrogen is first maintained followed by treatment under static conditions. The pretreatment under flow conditions involves maintaining a net flow of hydrogen over the molybdenum oxide catalyst. The rate of hydrogen during the first part of the treatment, e. g. about 0.1 to about 3 hours is kept to a minimum, for example, about 10 to about 100 standard cubic feet per hour per pound of molybdenum oxide. In some systems, such as a fluidized solids operation, it is necessary to maintain a continuous flow of hydrogen-containing gas for fluidization and hence effective contact between catalyst particles and hydrogen gas. Consequently, the net rate of hydrogen-containing gas provides a superficial linear gas velocity of about 0.1 to about 1 foot per second. After the initial treatment at a low net rate of hydrogen gas, the net rate of gas can be increased to about 50 to 400 standard cubic feet per hour per pound of molybdenum oxide for the remainder of the pretreatment, e. g. about 0.1 to about 2 hours or a superficial gas velocity of about 0.5 to 5.0 feet per second. The period of pretreatment during which the flow of hydrogen gas is maintained at a low net rate, is intended to simulate as much as possible a static condition for a system in which such a condition is not practical, because of poor contact resulting between a defluidized mass of finely divided catalytic particles and hydrogen gas.

The quantity of hydrogen employed in the pretreatment will depend largely upon the pressure desired for the operation. Greater quantities of hydrogen will be employed when pretreating at an elevated pressure than in the case of an operation at a lower pressure, assuming in each case a static condition or a condition involving the net rate of hydrogen passing over the catalytic material. Generally, about 10 to about 500 standard cubic feet of hydrogen (measured at 60° F. and 760 mm.) per hour per pound of molybdenum oxide is employed in the pretreatment operation. When a net flow condition is used, the net flow of hydrogen or hydrogen-containing gas for the entire pretreatment operation can be about 50 to about 400 standard cubic feet of gas per hour per pound of molybdenum oxide, preferably about 60 to 150, on the same basis.

It was found that there is an optimum quantity of water to be used in the preconditioning or pretreatment step of the catalyst. At the optimum quantity, the yield of reformed liquid product at a given octane level is unexpectedly better than operations involving quantities of water outside the optimum range. The optimum quantity of water to be used is at least about 2 mol percent, more usually about 2 to 6 mol percent, based on the quantity of hydrogen present, measured at inlet conditions. The optimum temperature of pretreatment is from about 930° to about 975° F., and this temperature in conjunction with the optimum quantity of water to be used in the pretreatment step results in operations of greatly improved yields of reformed liquid product as well as activity. In the optimum operation involving the quantities of water given above, any type of system can be used, namely, a static or a flow condition. For commercial applications, it is desirable to employ the optimum quantity of water during the pretreatment step with a steady flow of hydrogen through the catalyst zone. The hydrogen rate can be high or low, depending on whether a fluid or nonfluid system is under consideration.

Usually, the water required for pretreatment is added with the hydrogen-containing gas. This procedure can be varied by injecting the water or vapor thereof into the mass of catalyst after regeneration as a separate stream; or in the case of a moving bed system, the steam or water is fed into the catalyst stream which is flowing from the regenerator to the pretreating vessel. The technique of adding the steam first before contacting the catalyst with hydrogen can serve to safeguard the catalyst from undesirable effects, probably due to the presence of sorbed materials on the catalyst.

The physical form of the catalyst involved in the pretreatment operation will be determined by the type of system which is being used for the reforming operation. Accordingly, the catalyst may be used in the form of lumps, granules, pellets or finely divided material, depending upon the type of catalyst used in reforming the light hydrocarbon oil. In the case of a fixed bed reforming system, it is desirable to pretreat the catalyst, after it has been regenerated by means of an oxygen-containing gas, without transferring the catalyst from the processing vessel. In effect, the cycles of operation involve a reaction phase, regeneration phase and then a pretreatment phase, with or without suitable purging at appropriate intervals during the complete operation. In a moving bed system, it is preferred to employ a separate pretreating vessel for the purpose of conditioning the catalyst before use in the reaction zone. This involves transferring the catalyst from the regeneration zone to a pretreating zone, and then circulating catalyst to the reaction zone. The use of a separate vessel for pretreating applies to a fluid or nonfluid system, in either a fixed bed or moving bed operation.

The catalyst to be preconditioned in accordance with this invention involves molybdenum oxide supported on a carrier material. The carrier material can include, for example, alumina, silica, silica-alumina, magnesia, silica-magnesia, alumina-magnesia, pumice, kieselguhr, fuller's earth, "Superfiltrol," bentonite clays, etc. A particularly effective catalyst is molybdenum trioxide supported on alumina. Generally, the catalytic agent, namely, molybdenum oxide, comprises about 0.5 to about 24% by weight of the total catalyst, more usually, the catalyst agent constitutes about 1 to about 10% by weight of the catalyst. In some cases, it is preferred to employ small amounts of silica in combination with molybdenum trioxide on alumina. The silica is employed in proportions of about 0.5 to about 12%, more usually, about 2 to about 8% by weight, based on the total catalyst. The silica serves to enhance the stability of the catalyst at elevated temperatures, and further, it can, in some instances, increase the activity and/or selectivity of the catalyst after continued use.

As previously indicated, the pretreatment of molybdenum oxide catalyst results in higher yields of reformed liquid of high octane quality. The material to be reformed is a light hydrocarbon oil and includes, for example, gasoline, naphtha and kerosene. The light hydrocarbon oil has an initial boiling point of about 85 to about 325° F., and an end point of about 300 to about 500° F. In the case of reforming a naphtha fraction, it is preferred to employ a naphtha having an initial boiling point of about 100 to about 250° F., and an end point of about 350 to about 450° F. Generally, the light hydrocarbon oils to be reformed have a Watson characterization factor of about 11.50 to about 12.00. The feed material can be one which is a straight run or virgin stock, a cracked stock derived from a thermal or catalytic cracking operation or a mixture or blend of straight run and cracked stocks. Accordingly, the octane number of the feed material can range from about 20 to about 70 CFRR clear and have an olefin content of about 0 to about 30 mol percent. The light hydrocarbon oil can be derived from any type of crude oil, and thus it can contain sulfur in the amount of about 0 to about 3.0% by weight.

The light hydrocarbon oil is reformed under conditions which can involve the net consumption or net production of hydrogen. A system involving the net production of hydrogen is commonly referred to as hydroforming, and it is operated under such conditions that the quantity of hydrogen produced is sufficient to sustain the process without need for extraneous hydrogen. Generally, for the reforming of light hydrocarbon oils, a temperature of about 750° to about 1100° F. is employed. At this temperature, the pressure of the operation is generally maintained at about 50 to about 1000 p. s. i. g. The quantity of oil processed relative to the amount of catalyst employed is measured in terms of the weight space velocity, that is, the pounds of oil feed on an hourly basis charged to the reaction zone per pound of catalyst which is present therein. The weight space velocity can vary from about 0.05 to about 10. The quantity of hydrogen which is added to the process is usually measured in terms of the standard cubic feet of hydrogen (measured at 60° F. and 760 mm.) per barrel of oil feed charged to the reforming operation (one barrel equals 42 gallons). On this basis, the hydrogen rate is about 500 to about 20,000 S. C. F. B. preferably about 1500 to 6000 S. C. F. B. Another method of indicating the quantity of hydrogen which can be present during the hydroforming operation is by means of hydrogen partial pressure. In this regard, the hydrogen partial pressure is about 25 to about 950 p. s. i. g.

In a hydroforming operation, the reaction conditions fall within the ranges specified hereinabove, however, they are selected on the basis of obtaining a net production of hydrogen. Accordingly, a preferred hydroforming process involves a temperature of about 850° to about 1050° F.; a pressure of about 50 to about 500 p. s. i. g.; a weight space velocity of about 0.1 to about 2; a hydrogen rate of about 1000 to 7500 S. C. F. B. and a hydrogen partial pressure of at least about 25 p. s. i. g. and up to the point at which hydrogen is consumed.

The reforming of the light hydrocarbon oil can be effected with or without the use of a small amount of water. Apparently, the pretreatment of molybdenum oxide catalyst with hydrogen containing a small amount of water imparts sufficient desired activity to the catalyst to make possible the production of significantly higher yields of reformed liquid product of high anti-knock quality. Hence, it is preferred in a reforming operation to employ a small amount of water during the operation to insure the production of higher yields of reformed liquid product of high octane quality. Accordingly, it is contemplated reforming light hydrocarbon oils in the presence of about 0.1 to about 10 mol percent of water, preferably about 0.25 to about 3 mol percent of water, based on the amount of hydrogen which is added to the reforming zone. The water employed for this purpose can be added to the hydrogen-containing gas stream which is charged to the reaction zone; and/or it can be added in the form of a liquid to the oil feed and/or it can be added directly to the reforming zone. In any manner of addition of the water, it is contemplated measuring the quantity thereof on the basis of the amount of hydrogen which is added to the reforming step.

Due to the reforming operation, the molybdenum oxide catalyst becomes contaminated with carbonaceous material which lowers its catalytic activity undesirably. Hence, the catalyst is subjected to a regeneration treatment which involves contacting same with an oxygen containing gas, e. g., oxygen, air, diluted air having about 1 to about 10% oxygen by volume, etc., at a temperature of about 600° to about 1250° F., preferably about 950° to about 1150° F. The regeneration is effected at atmospheric pressure or an elevated pressure of about 50 to about 1000 p. s. i. g. Prior to regeneration the catalyst contains about 0.1 to about 5.0% by weight of carbonaceous material, and due to regeneration the carbonaceous material content is reduced to zero content or up to about 0.5% by weight. It is desirable to remove as much carbonaceous material as is economical, because possibly such material deposited on the catalyst undesirably may tend to cover the active molybdenum oxide centers, and thus render less effective the pretreatment operation. In such a case, the ideal situation may be to burn off all the carbonaceous material deposited on the catalyst.

It was quite unexpectedly found that regeneration of the catalyst at elevated pressures results in higher yields of reformed liquid product of given octane quality than an operation including regeneration at atmospheric pressure. In this regard, it is preferred to conduct the regeneration step with an oxygen partial pressure of at least about 5 p. s. i. a., usually about 6 to about 100 p. s. i. a. A possible explanation is that severe regeneration conditions effect the more complete removal of deposits which are adverse to catalyst activity.

The reforming operation can be accomplished using a fluid or non-fluid technique, involving either a fixed bed or a moving bed system. In the case of a fixed bed operation, at least two processing vessels are employed in order that while one vessel is under regeneration and/or pretreatment, the other vessel is processing the light hydrocarbon oil to be reformed. In the commercial operations of present day, usually four processing vessels are employed. This is also suitable in the present invention, because it provides for larger quantities of material to be reformed. Normally, in a fixed bed system, the reaction cycle takes about 0.25 to about 8 hours, the regeneration takes about 0.25 to about 8 hours and the pretreating operation can require about 0.1 to about 2.0 hours. In a fluid-moving bed system, the finely divided catalytic material has a particle size in the range of about 5 to about 250 microns, more usually, about 10 to about 100 microns. The mass of finely divided material is fluidized by the upward flow of gaseous or vapor materials therethrough which have a superficial linear velocity by about 0.1 to about 50 feet per second, more usually, about 0.1 to about 6 feet per second. In commercial operations, it is preferred to employ a superficial linear gas velocity of about 0.75 to about 2 feet per second. These linear gas velocities can exist in any of the processing vessels, namely, the reactor, the regenerator, the pretreating vessel and the transfer lines between vessels. Furthermore, the specified linear gas velocitie can provide either a lean or dense phase of fluid mass. Usually, it is preferred to employ a dense phase because it provides a more intimate contact between the gas and/or vapor and the catalyst particles. The relative rates of catalyst being circulated and the oil being charged to the reaction zone is usually termed the catalyst to oil ratio, on a weight basis. Generally, in a moving bed system, the catalyst to oil ratio is about 0.05 to about 20. For commercial operations, it is preferred to employ a catalyst to oil ratio of about 0.5 to about 5.0.

In the practice of this invention it is preferred that the preconditioned catalyst, whether it is prereduced under the optimum conditions specified hereunder or not, be contacted with the oil charge for a period not greater than about 2 hours. In a fixed bed system this condition is measured as the reaction cycle or period, whereas in a moving bed system it is the catalyst residence time in the reaction zone. When the preconditioned catalyst (obtained by pre-reduction under any conditions) is employed in a reforming operation without the use of small amounts of water, it is noted that a catalyst-processing time of about 2 hours produces higher yields of reformed liquid product at a given octane level without apparently being affected by reforming temperature. In the case of using a preconditioned catalyst in a reforming operation including small amounts of water, it is noted that a reforming temperature greater than about 900° F., preferably at least about 930° F. should be employed to realize an increase in reformed liquid product yield for a catalyst processing time of 2 hours over a greater processing time e. g. 8 hours. For the purpose of this specification and the appended claims, "catalyst processing time" is intended to mean the length of time catalyst is contacted with oil prior to being regenerated or otherwise discontinued from use, and this factor is measured as the reaction cycle or period in a fixed bed and the catalyst residence time in the reaction zone in a moving bed system.

Having thus provided a general description of the present invention, references will be had to the accompanying drawing which illustrates a test unit which was employed for the purpose of evaluating the present invention.

In the accompanying drawing, hydrogen was supplied from source 5 and it passed into a rotometer 6 wherein the rate of hydrogen was measured. The measured hydrogen flowed from the rotometer to a valved line 8 and thereafter it passed to one of two circuits, namely, a circuit involving the removal of oxygen and water from the hydrogen gas stream and the other circuit which bypassed the oxygen removal system going directly to a wet test meter. Water was added to either stream of hydrogen gas in the desired quantity. When it was desired to produce dry hydrogen, the hydrogen flowed into line 10 which contained a valve 11 in an open position. The processing of the hydrogen through the other circuit involved passing the hydrogen through a line 12 which contained a valve 14. The hydrogen in line 10 flowed into a Deoxo unit 16 comprised of palladium on aluminum oxide wherein oxygen removal was effected. Following the deoxygenation step in vessel 16, the hydrogen passed from the bottom thereof into a line 18 which was connected to the bottom end of a dryer 20 having present therein anhydrous calcium sulfate for the removal of moisture in the hydrogen gas. The dried hydrogen gas passed overhead from dryer 20 into an overhead line 21 and then it was measured by means of a wet test gas meter 23. A hydrocarbon mixture similar to the charge naphtha was used in the wet test meter instead of water. Since the hydrogen gas might absorb a small amount of water which might be present in the hydrocarbon mixture in the gas meter, it was passed through a line 25 which was connected to a second dryer 26 containing anhydrous calcium sulfate for the removal of water. The hydrogen gas stream was discharged from the top of dryer 26 through a line 28 which joined with a line 29. The deoxygenated gas was then passed through line 34 to the water saturator, 37, where the desired concentration of water vapor was supplied. If no water was desired the dry deoxogenated hydrogen by-passed the saturator through line 42.

In the event that it was desired to incorporate a predetermined quantity of water vapor into the hydrogen gas stream, without removing traces of oxygen beforehand, valve 11 in line 10 was kept in a closed position and valve 14 in line 12 was open. In this case, the measured hydrogen from rotometer 6 was first measured in a high pressure wet test gas meter 30. The measured hydrogen gas stream flowed first through line 29 in which there was situated a valve 32. In this type of an operation, valve 32 was maintained in a closed position and the hydrogen gas stream flowed through a line 34 in which there was installed a valve 35 in an open position. The hydrogen gas stream then passed into the bottom of a saturator 37 which contained water and was surrounded by an electric jacket to maintain the temperature at a desired level for obtaining the appropriate quantity of water vapor in the hydrogen gas stream. The moisture-laden hydrogen gas passed overhead from saturator 37 into a line 39 in which there was installed a valve 40 in an open position. When a dry gas was employed for the pretreating operation, valves 35 and 39 were maintained closed in order to avoid moisture from getting into the hydrogen gas. Likewise, in such an operation, valve 32 in line 29 was kept open in order that the hydrogen gas by-passed saturator 37 by means of a line 42. The hydrogen-containing gas then flowed through a line 43 which was connected to a main header 45 by which processing materials were charged to the reaction zone containing the catalytic material.

During the reaction cycle, the oil being processed was supplied from an oil feed tank 50 through a line 51 connected to the bottom thereof and thence transported by means of pump 53 through a line 55 which was connected to the main header 45. The mixture of hydrogen-containing gas and oil flowed from header 45 into a line 57 which was connected to a coil 58 surrounding the reactor vessel 60. The coil 58 was wound downwardly across the length of the reactor for a coil length distance of 10 feet, and then upwardly across the same area of the reactor before entering the top of the reactor as line 62. The reactor was a cylindrical vessel having an internal diameter of 1.5 inches and a length of 1.5 feet. The catalytic material, being present in the form of 3/16 inch pellets, occupied about 550 cc. of the reactor capacity. The reactant materials flowed downwardly over the catalytic material and thence passed from the reaction zone through a bottom line 64 which was connected to a condenser 65. The reaction product passed through an interval coil 66 which was surrounded by cooling water introduced via line 68 and then leaving the condenser via line 70. The condensed liquid product flowed from the bottom of the condenser through a line 72 which was connected to the top of a high pressure receiver 73. Any gaseous material which was combined with the liquid product passed from receiver 73 into an overhead line 75 which was connected to a secondary cooler 76. In the secondary cooler any gaseous material which was condensable accumulated therein and was removed from the bottom thereof through a line 79. The normally gaseous material in the secondary cooler 76 passed overhead through a line 80. The liquid product in high pressure receiver 73 was discharged through the bottom thereof by means of a line 82 and it combined with the liquid product flowing through line 79 in line 83 in which there was installed a valve 84 for the purpose of maintaining the desired high pressure within receiver 73. The combined liquid product was then discharged from receiver 85 through a bottom valved line 87. Any gaseous material which was present with the liquid product was removed from the top of receiver 85 and it flowed through a line 89. The normally gaseous product from the secondary cooler 76 is passed through a pressure control valve 92 which is installed in the overhead line 80. The normally gaseous products in lines 80 and 89 were combined in line 94 before passing through a gas meter 95. The measured gaseous product then flowed through a line 97 before a portion thereof was taken as a gas sample through a valved line 98 and the remainder was vented through a line 99.

The temperature of the reaction zone was maintained by submerging the reactor with coil 58 into a molten lead bath maintained at a desired temperature. The molten lead bath is not shown in the schematic diagram. After the reaction cycle had run for the prescribed period of time, the catalytic material was regenerated by employing a regeneration gas constituting a mixture of nitrogen and air. In the case of regenerating at atmospheric pressure air was introduced through a line 101 and nitrogen was supplied through a line 102, and both of these lines were connected to the main header 45, from which the material passed into line 57 prior to flowing through coil 58 circumscribing the reaction vessel. Following the reaction cycle, the stream of nitrogen was passed through the reactor in order to remove as much of the reaction product wetting the catalyst as was possible. This was carried out at a temperature of about 875 to 1050° F. and for a period of 45 minutes. Following the purging cycle, air was introduced along with the nitrogen in a quantity appropriate to obtain 2% by volume of oxygen. The temperature of the catalyst during this cycle of the operation was maintained at about 950 to about 1100° F. The concentration of air was increased during the regeneration until the oxygen concentration was about 8% by volume. The concentration of air was controlled at the lower concentrations to prevent the temperature from exceeding 1150° F. When it appeared that all combustible materials had been removed the catalyst was treated with 100% air for one-half hour. In the case of regeneration under super atmospheric pressure the procedure was similar to that described above. The passage of the regeneration gas continued for a period of about 4 hours. Following the regeneration of the catalyst, nitrogen, without previous treatment as to water content or oxygen-containing compounds, was passed through the reactor 60 in order to purge the same of any air or flue gas which might be present. The purging cycle with hydrogen was conducted at a temperature of about 875 to about 1050° F. and for a period of about 15 minutes. Following the nitrogen purge of the reactor, operation was commenced in the desired manner in order to evaluate the various factors of pretreatment and reaction conditions.

The feed material employed for the purpose of evaluating the present invention is described in Table I below.

*Table I*

| Feed designation | I |
|---|---|
| Gravity, ° API | 55.4 |
| ASTM distillation, ° F.: | |
| I. B. P | 206 |
| 5 | 256 |
| 10 | 264 |
| 20 | 274 |
| 30 | 282 |
| 40 | 290 |
| 50 | 299 |
| 60 | 306 |
| 70 | 316 |
| 80 | 328 |
| 90 | 346 |
| 95 | 360 |
| E. P | 381 |
| Reed vapor pressure, p. s. i | 0.7 |
| K-characterization factor | 12.00 |
| Refractive index, $n_D^{68}$ | 1.4229 |
| Aniline point, ° F | 133 |
| Octane No. (CFRR clear) | 30.2 |
| Aromatics, vol. percent (ASTM) | 12.5 |
| Olefins, mol percent | 0.6 |
| Sulfur, wt. percent | 0.073 |
| Molecular weight | 125 |

The catalyst used for this evaluation is described in Table II below.

*Table II*

| Catalyst Designation | A | B |
|---|---|---|
| Component, Wt. Percent: | | |
| $MoO_3$ | 9.3 | 9.3 |
| $SiO_2$ | 3.6 | 3.6 |
| $Fe_2O_3$ | 0.03 | 0.03 |
| Chloride ion | 0.4 | 0.4 |
| $Al_2O_3$ | 86.7 | 86.7 |

The results obtained in the evaluation of the present invention are given in Table III below.

Table III

| Run No | 1 | 2 | 3 |
|---|---|---|---|
| Catalyst | A | A | B |
| Feed | I | I | I |
| Operating Conditions: | | | |
| Temperature, °F | 930 | 900 | 930 |
| Pressure, p. s. i. g | 250 | 250 | 250 |
| Space Vel., $W_o$/hr./$W_c$ | 0.5 | 0.8 | 0.5 |
| $H_2$ rate, S. C. F. B | 5,000 | 5,000 | 5,000 |
| Oil Rate, gm./hr | 285 | 432 | 261 |
| Catalyst, gm | 539 | 555 | 539 |
| Mol percent $H_2O$ (Basis $H_2$) | 0.5 | 0.5 | 0.5 |
| Period of Run, hrs | 2 | 2 | 2 |
| Pretreatment of Catalyst: | | | |
| Temperature, °F | 930 | 915 | 947 |
| Hydrogen pressure, p. s. i. g | 0 | 250 | 250 |
| Static Condition | | yes | yes |
| Flowing Condition | yes | yes | yes |
| Period of treatment, hrs | 4 | 1.25 | 1.0 |
| Mol percent $H_2O$ in $H_2$ | | | 0.5 |
| Yields (Output Basis): | | | |
| Liquid yield (100% $C_4$), Vol. percent | 85.7 | 90.3 | 87.4 |
| $C_4$-free liquid, Vol. Percent | 75.0 | 83.5 | 79.3 |
| Butanes, Vol. Percent | 10.7 | 6.8 | 8.1 |
| Dry Gas, Wt. Percent | 14.4 | 9.0 | 10.9 |
| Carbon, Wt. Percent | | | |
| Hydrogen, S. C. F. B | 319 | 600 | 363 |
| Inspections: | | | |
| Octane No. (CFRR clear) $C_4$-free gasoline | 93.0 | 82.0 | 95.6 |
| Yield of $C_4$-free gasoline of 85 O. N. (CFRR clear) | 80.8 | 81.9 | 87.6 |

From Table III above, it is to be noted that the pretreatment of molybdenum oxide catalyst involving dry hydrogen at atmospheric pressure, as shown in run No. 1, results in significantly lower yields of $C_4$-free gasoline of 85 octane number than is obtained in the case of using dry hydrogen at 250 p. s. i. g. under flow conditions, as shown in run No. 2. Run No. 3 is an example of the application of the present invention, wherein the procedure for pretreatment was as follows:

(a) The catalyst was regenerated with air and nitrogen at 950° F.

(b) The catalyst bed was flushed with nitrogen for fifteen minutes at 940° F. and atmospheric pressure.

(c) Hydrogen containing 0.5 mol percent of water was introduced at atmospheric pressure and at the rate of 30 standard cubic feet per hour. The pressure was allowed to build up to 275 p. s. i. g. and it took about 3 minutes to effect this pressure level. During this stage, the temperature of the catalyst bed increased 50° F.

(d) A static pressure of 275 p. s. i. g. of wet hydrogen was maintained for 15 minutes.

(e) The pressure was reduced to 250 p. s. i. g. and hydrogen containing 0.5 mol percent of water was passed over the catalyst at the rate of 11.0 standard cubic feet per hour for 45 minutes.

Steps (c), (d) and (e) were conducted at a temperature of 950° to 940° F.

(f) Oil was charged with wet hydrogen flowing to the reactor.

It is to be noted from the comparison of run No. 3 and run No. 2 in Table III that improved results in the yield of $C_4$ free-gasoline of 85 octane number is obtained when conducting the pretreatment of catalyst with hydrogen-containing gas including a small amount of water.

In the runs reported in Table IV below, the pre-reduction treatment was effected in the following manner. Following regeneration, the reaction zone was pressured with dry nitrogen to 275 p. s. i. g. and this took 5 minutes. For the next fifteen minutes the system was maintained at this pressure under static conditions, i. e. no net flow of nitrogen took place. In runs 2 and 3 in Table IV, the temperature was 975° F., and in run 1 the temperature was 930° F. during the fifteen minute period. Following the pressure test, wet hydrogen at the rates and conditions indicated in the table were passed through the system. After the pre-reduction treatment, the oil feed was charged to the system.

Table IV

| Run No | 1 | 2 | 3 |
|---|---|---|---|
| Catalyst | B | B | B |
| Feed | I | I | I |
| Operating Conditions: | | | |
| Temperature, °F | 930 | 930 | 930 |
| Pressure, p. s. i. g | 250 | 250 | 250 |
| Space Vel., $W_o$/Hr./$W_c$ | 0.5 | 0.5 | 0.5 |
| $H_2$ rate, S. C. F. H | 11.0 | 11.0 | 11.0 |
| Mol Percent $H_2O$ in $H_2$ | 0.5 | 0.5 | 0.5 |
| Reaction Period, hrs | 2 | 2 | 2 |
| Pre-reduction Conditions: | | | |
| Temperature | 930 | 975–930 | 975–930 |
| Pressure | 250 | 250 | 250 |
| Time, Min | 60 | 27 | 30 |
| $H_2$ rate, S. C. F. H | 11.0 | 11.0 | 11.0 |
| Mol Percent $H_2O$ in $H_2$ | 0.5 | 2.0 | 10.0 |
| Results: | | | |
| Liquid yield, Vol. Percent | 82.6 | 90.0 | 86.3 |
| Aniline PT, °F. of Liquid | 75 | 76 | 76 |

From Table IV above, it is to be noted that the optimum quantity of water in the prereduction gas is at least about 2 mol percent, based on the hydrogen. The amount of decrease in liquid yield for the run in which the water concentration of the prereduction gas was 10 mol percent indicates that rate of lowering liquid yields resulting from decreasing the water concentration from 2 mol percent of water to 10 mol percent of water is significantly less than the rate of decrease in yield for the region of water concentration ranging from 2.0 to 0.5 mol percent. This indicates that the optimum concentration is at least about 2.0 mol percent water, and preferably, the water concentration should be about 3 to 6 mol percent.

The effect of regeneration conditions is shown by the following series of runs. In run 1 of Table V below, the regeneration at 950° F. and atmospheric pressure was followed by flushing or purging the system with air at 950° F. and then flushing with nitrogen at 950–930° F. Then the system was pressured with nitrogen to 250 p. s. i. g., and at a temperature of 930° F., the catalyst was prereduced. In run 2 of Table V, the regeneration was effected at 250 p. s. i. g., and the steps of flushing with air first and then with nitrogen was effected at the same pressure. Following the nitrogen flush, the prereduction step was effected at pressure.

In run 3 of Table V, following the regeneration step at atmospheric pressure and 950° F., the reactor was flushed with air at 1050° F., and then with nitrogen at 1050–975° F. The unit was then pressured with nitrogen to 250 p. s. i. g., and prereduction was commenced immediately following. In run 4 of Table V, the regeneration at 950° F. and 250 p. s. i. g. was followed with air and nitrogen flushes consecutively at the temperatures specified above for run 3, except that the system was held at 250 p. s. i. g. Thereafter, prereduction was started under the conditions given in the table.

Table V

| Run No | 1 | 2 | 3 | 4 |
|---|---|---|---|---|
| Catalyst | B | B | B | B |
| Feed | I | I | I | I |
| Reaction Conditions: | | | | |
| Temperature, °F | 930 | 930 | 930 | 930 |
| Pressure, p. s. i. g | 250 | 250 | 250 | 250 |
| Space Vel., $W_o$/hr./$W_c$ | 0.5 | 0.5 | 0.5 | 0.5 |
| $H_2$ rate, S. C. F. B | 5,000 | 5,000 | 5,000 | 5,000 |
| Mol Percent $H_2O$ in $H_2$ | 0.5 | 0.5 | 0.5 | 0.5 |
| Reaction Period | 2 | 2 | 2 | 2 |
| Regeneration Conditions: | | | | |
| Temperature | 950 | 950 | 950 | 950 |
| Pressure | Atm. | 250 | Atm. | 250 |
| Prereduction Conditions: | | | | |
| Temperature, °F | 930 | 930 | 975–930 | 975–930 |
| Pressure, p. s. i. g | 250 | 250 | 250 | 250 |
| $H_2$ rate, S. C. F. H | 11.0 | 11.0 | 11.0 | 11.0 |
| Mol Percent $H_2O$ in $H_2$ | 0.5 | 0.5 | 2.0 | 2.0 |
| Time, hrs | 1 | 0.75 | 0.5 | 0.5 |
| Results: | | | | |
| Liquid Yield | 80.6 | 82.9 | 85.1 | 89.2 |
| Aniline Pt., °F | 67 | 54 | 54 | 56 |

From Table V above, it is to be noted that in each case where the system was regenerated under an elevated pressure, a greater yield of reformed liquid product of good quality was obtained.

Having thus described the present invention by references to specific examples thereof, it should be understood that no undue limitations or restrictions by reason thereof, but that the scope of the invention is defined by the appended claims.

We claim:

1. A process which comprises regenerating a molybdenum oxide catalyst containing carbonaceous material by burning with an oxygen containing gas for the removal of carbonaceous material in an amount sufficient to restore catalytic properties substantially for reforming light hydrocarbon oils, treating the regenerated catalyst with a gaseous material containing free hydrogen at a temperature of about 875° to about 1050° F., in the presence of added water in the amount of about 0.1 to about 15 mol percent, contacting the treated catalyst with a light hydrocarbon oil under suitable reforming conditions to produce a reformed liquid product of high anti-knock quality.

2. The process of claim 1 wherein the reforming conditions include the presence of added water in the amount of about 0.1 to about 10 mol percent.

3. The process of claim 1 wherein the regeneration of the catalyst is effected with an oxygen containing gas having an oxygen partial pressure of about 6 to about 100 p. s. i. a. under regeneration conditions.

4. A process which comprises regenerating a molybdenum oxide catalyst containing carbonaceous material by burning with an oxygen containing gas having an oxygen partial pressure of about 6 to about 100 p. s. i. a. such that the carbonaceous material is removed to the extent of restoring catalytic properties substantially for reforming of light hydrocarbon oils, treating the regenerated catalyst with a gaseous material containing free hydrogen at a temperature of about 875° to about 1050° F., in the presence of added water in the amount of about 2 to about 6 mol percent, contacting the treated catalyst with a light hydrocarbon oil under suitable reforming conditions including the presence of added water in the amount of about 0.25 to about 3.0 mol percent such that a reformed liquid product of high anti-knock quality is produced.

5. A process which comprises regenerating a molybdenum oxide catalyst containing carbonaceous material by burning with an oxygen containing gas having an oxygen partial pressure of about 6 to about 100 p. s. i. a., at a temperature of about 950° to about 1150° F., thereby producing a regenerated catalyst having catalytic properties restored substantially for reforming light hydrocarbon oils, treating the regenerated catalyst with a gaseous material containing free hydrogen at a temperature of about 875° to about 1050° F., in the presence of added water in the amount of about 2 to about 6 mol percent, contacting the treated catalyst with a light hydrocarbon oil under suitable reforming conditions including a temperature of about 850° to about 1050° F., in the presence of added water in the amount of about 0.1 to about 10 mol percent, thereby producing a reformed liquid product of high anti-knock quality.

6. A process which comprises regenerating a molybdenum oxide catalyst containing carbonaceous material by burning with an oxygen containing gas having an oxygen partial pressure of about 6 to about 100 p. s. i. a., thereby producing a regenreated catalyst having catalytic properties restored substantially for reforming light hydrocarbon oils, treating the regenerated catalyst with a gaseous material containing free hydrogen at a temperature of about 930° to about 975° F., in the presence of added water in the amount of about 0.1 to about 15 mol percent, contacting the treated catalyst with a light hydrocarbon oil under suitable reforming conditions, including a temperature of about 850° to about 1050° F., a pressure of about 50 to about 500 p. s. i. g., and in the presence of added water in the amount of about 0.1 to about 10 mol percent, thereby producing a reformed liquid product of high anti-knock quality.

7. A process which comprises regenerating a molybdenum oxide catalyst containing carbonaceous material by burning with an oxygen containing gas having an oxygen partial pressure of about 6 to about 100 p. s. i. a. at a temperature of about 950° to about 1150° F., thereby producing a regenerated catalyst having catalytic properties restored substantially for reforming light hydrocarbon oils, treating the regenerated catalyst with a gaseous material containing free hydrogen at a temperature of about 930° to about 975° F., in the presence of added water in the amount of about 2 to about 6 mol percent, contacting the treated catalyst with a light hydrocarbon oil under suitable reforming conditions including a temperature of about 550° to about 1050° F., in the presence of added water in the amount of about 0.25 to about 3.0 mol percent, and in the presence of added hydrogen in the amount of 1000 to 7500 S. C. F. B., thereby producing a reformed liquid product of high anti-knock quality.

8. A process which comprises regenerating a molybdenum oxide catalyst containing carbonaceous material by burning with an oxygen containing gas having an oxygen partial pressure of about 6 to about 100 p. s. i. a., under a total pressure of about 50 to about 1000 p. s. i. g., a temperature of about 950° to about 1150° F., thereby producing a regenerated catalyst having catalytic properties restored substantially for reforming light hydrocarbon oils, treating the regenerated catalyst with a gaseous material containing hydrogen at a temperature of about 875° to about 1050° F., in the presence of added water in the amount of about 2 to about 6 mol percent, at a pressure of about 50 to about 1000 p. s. i. g., contacting the treated catalyst with a light hydrocarbon oil under suitable reforming conditions including a temperature of about 850° to about 1050° F., a pressure of about 50 to about 500 p. s. i. g., a weight space velocity of about 0.1 to about 2.0, in the presence of added hydrogen in the amount of about 1000 to about 7500 S. C. F. B., and in the presence of added water in the amount of about 0.1 to about 10 mol percent, thereby producing a reformed liquid product of high anti-knock quality.

9. The process of claim 8 wherein the light hydrocarbon oil is a naphtha fraction.

10. The process of claim 8 wherein the gaseous material containing hydrogen is substantially all hydrogen.

11. The process of claim 8 wherein the catalyst is molybdenum trioxide supported on alumina.

12. The process of claim 8 wherein the catalyst is molybdenum trioxide suported on alumina, the light hydrocarbon oil is a naphtha fraction and the gaseous material containing hydrogen is substantially all hydrogen.

13. A process which comprises regenerating a molybdenum oxide catalyst containing carbonaceous material by burning with an oxygen containing gas for the removal of carbonaceous material in an amount sufficient to restore catalytic properties substantially for reforming light hydrocarbon oils, treating the regenerated catalyst with a gaseous material containing free hydrogen at a temperature of about 900° to about 1050° F., in the presence of added water in the amount of about 1 to about 2 mol percent, contacting the treated catalyst with a light hydrocarbon oil under suitable reforming conditions to produce a reformed liquid product of high anti-knock quality.

14. A process which comprises regenerating a molybdenum oxide catalyst containing carbonaceous material by burning with an oxygen containing gas for the removal of carbonaceous material in an amount sufficient to restore catalytic properties substantially for reforming light hydrocarbon oils, treating the regenerated catalyst with a material containing free hydrogen at a temperature of about 930 to about 975° F., in the presence of added water in the amount of about 2 mol percent, contacting the treated catalyst with a light hydrocarbon oil under suitable reforming conditions to produce a reformed liquid product of high and anti-knock quality.

15. The process of claim 13 in which the catalyst is molybdenum oxide supported on alumina.

16. The process of claim 15 in which the alumina contains between about 0.5 to about 12 percent by weight of silica.

17. The process of claim 14 in which the light hydrocarbon oil contains up to about 3 percent by weight of sulfur.

References Cited in the file of this patent

UNITED STATES PATENTS

| | | |
|---|---|---|
| 2,131,089 | Beeck | Sept. 27, 1938 |
| 2,408,996 | Parker et al. | Oct. 8, 1946 |
| 2,419,323 | Meinert et al. | Apr. 22, 1947 |
| 2,433,603 | Danner | Dec. 30, 1947 |
| 2,453,327 | Layng et al. | Nov. 9, 1948 |
| 2,642,383 | Berger | June 16, 1953 |
| 2,687,370 | Hendricks | Aug. 24, 1954 |
| 2,687,987 | Bennett | Aug. 31, 1954 |

UNITED STATES PATENT OFFICE
CERTIFICATE OF CORRECTION

Patent No. 2,867,579　　　　　　　　　　　　　　　　　　　　January 6, 1959

Robert T. Loughran et al.

It is hereby certified that error appears in the printed specification of the above numbered patent requiring correction and that the said Letters Patent should read as corrected below.

Column 5, line 56, for "velocitie" read -- velocities --; column 11, line 68, for "regenreated" read -- regenerated --; column 13, line 8, strike out "and".

Signed and sealed this 21st day of April 1959.

(SEAL)
Attest:
KARL H. AXLINE
Attesting Officer

ROBERT C. WATSON
Commissioner of Patents